(12) United States Patent
San

(10) Patent No.: US 11,609,455 B2
(45) Date of Patent: Mar. 21, 2023

(54) DISPLAY PANEL STRUCTURE CAPABLE OF ENHANCING STRUCTURAL STRENGTH AROUND A BONDING AREA OF AN ARRAY SUBSTRATE AND A DISPLAY DEVICE HAVING THE SAME

(71) Applicant: WUHAN CHINA STAR OPTOELECTRONICS TECHNOLOGY CO., LTD., Hubei (CN)

(72) Inventor: Yingzhi San, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 488 days.

(21) Appl. No.: 16/626,581

(22) PCT Filed: Sep. 30, 2019

(86) PCT No.: PCT/CN2019/109548
§ 371 (c)(1),
(2) Date: Dec. 26, 2019

(87) PCT Pub. No.: WO2020/258578
PCT Pub. Date: Dec. 30, 2020

(65) Prior Publication Data
US 2021/0405416 A1    Dec. 30, 2021

(30) Foreign Application Priority Data
Jun. 24, 2019 (CN) .......................... 201910551084.0

(51) Int. Cl.
*G02F 1/1339* (2006.01)
*G02F 1/1335* (2006.01)
(Continued)

(52) U.S. Cl.
CPC ........ *G02F 1/13394* (2013.01); *G02F 1/1341* (2013.01); *G02F 1/1368* (2013.01);
(Continued)

(58) Field of Classification Search
CPC combination set(s) only.
See application file for complete search history.

(56) References Cited

U.S. PATENT DOCUMENTS

2014/0063432 A1* 3/2014 Yamazaki ............. G02F 1/1368
349/153
2016/0274394 A1* 9/2016 Yamazaki ......... G02F 1/133345

FOREIGN PATENT DOCUMENTS

CN         1996118 A       7/2007
CN         101251670 A     8/2008
(Continued)

*Primary Examiner* — Lauren Nguyen
(74) *Attorney, Agent, or Firm* — PV IP PC; Wei Te Chung; Ude Lu

(57) ABSTRACT

A display panel structure includes an array substrate, a color filter substrate, and a liquid crystal layer. The array substrate includes a bonding area and a reinforcing device disposed between the bonding area and an edge of the array substrate. An adhesive layer is disposed on a surface of the reinforcing device corresponding to the array substrate. The reinforcing device provided as a dual reinforcing structure formed by the reinforcing glue, the retaining wall, and the base to effectively enhance structural strength around the bonding area of the array substrate.

9 Claims, 3 Drawing Sheets

(51) Int. Cl.
　　　*G02F 1/1341*　　　(2006.01)
　　　*G02F 1/1345*　　　(2006.01)
　　　*G02F 1/1368*　　　(2006.01)
(52) U.S. Cl.
　　　CPC .... *G02F 1/13452* (2013.01); *G02F 1/133514* (2013.01); *G02F 1/133528* (2013.01); *G02F 2202/28* (2013.01)

(56)　　　　　References Cited

FOREIGN PATENT DOCUMENTS

| | | | |
|---|---|---|---|
| CN | 104103662 | A | 10/2014 |
| CN | 205210473 | U | 5/2016 |
| CN | 106773213 | A | 5/2017 |
| CN | 107479236 | A | 12/2017 |
| CN | 110244485 | A | 9/2019 |
| JP | 2005134637 | A | 5/2005 |

\* cited by examiner

DISPLAY PANEL STRUCTURE CAPABLE OF ENHANCING STRUCTURAL STRENGTH AROUND A BONDING AREA OF AN ARRAY SUBSTRATE AND A DISPLAY DEVICE HAVING THE SAME

BACKGROUND OF INVENTION

1. Field of Invention

The present invention relates to a technical field of displays, and particularly to, a display panel structure and a display device.

2. Related Art

Flat panel displays are the mainstream of today's display devices, and can be classified into liquid crystal display devices and organic light-emitting diode (OLED) display devices according to light-emitting types. Regardless of liquid crystal display devices or OLED display devices, they, they are all configured with thin-film transistors (TFTs) as a switch for circuit control of pixel units.

Taking liquid crystal display modules of liquid crystal display devices as an example, color filter (CF) substrates and array substrates configured with TFTs arranged in an array are laminated to each other. The array substrates are bonded with driver devices. The array substrates are prone to break due to weak structural strength of a single glass layer of a bonding area on the array substrates. Currently, a method used to reinforce structural strength is to additionally dispense a glue on a single-layer glass area of TFT array substrates for buffering a force from outside. But, a coverage where the glue is dispensed on the single-layer glass area of the array substrates is not clearly defined and is difficult to manage. The glue tends to spread to other none-glue areas, affecting the integrity of subsequent assembly of devices and a normal use of internal components. Besides, because a glue substance has fluidity before it is uncured, if the dispensing is too close to edges of the array substrates, it is easy to overflow and to cause stress concentration, which cannot achieve the purpose of enhancing the structural strength. If the dispensing is too far from the edges of the array substrates, structural strength of the edges of the array substrates cannot be reinforced, resulting in a poor reinforcing performance as a whole.

SUMMARY OF INVENTION

An object of the present invention is to provide a display panel structure and a display device capable of effectively enhancing structural strength to avoid cracking at an edge of a substrate structure.

To achieve the above-mentioned object, the present invention provides a display panel structure, comprising an array substrate, a color filter substrate, and a liquid crystal layer disposed between the array substrate and the color filter substrate, wherein the array substrate comprises a bonding area; and a reinforcing device disposed between the bonding area and an edge of the array substrate, and an adhesive layer is disposed on a surface of the reinforcing device corresponding to the array substrate.

In one aspect of the present invention, the retaining wall is disposed along a periphery of the base and has a height higher than a surface of the base, wherein thickness of the reinforcing glue is equal to or less than the height of the retaining wall.

In another aspect of the present invention, the reinforcing glue has an area less than that of the base, and a periphery of the reinforcing glue adjoins a side face of the retaining wall adjacent to the accommodation groove.

In another aspect of the present invention, the reinforcing glue is silicone glue.

In another aspect of the present invention, the base and the retaining wall of the reinforcing device are made of plastic of metal.

In another aspect of the present invention, one end of the reinforce device is connected to the bonding area, and the other end extends to the edge of the array substrate, wherein the reinforcing device is disposed between each of two opposite ends of the bonding area and the edge of the array substrate.

In another aspect of the present invention, a driver module is disposed on the bonding area and comprises a flexible circuit board and a chip disposed on the flexible circuit board.

In another aspect of the present invention, the array substrate comprises a plurality of thin-film transistors, and an upper polarizer is disposed on the color filter substrate.

The present invention further provides a display device, comprising the abovementioned display panel structure.

The present invention further provides a display panel structure, comprising an array substrate, a color filter substrate, and a liquid crystal layer disposed between the array substrate and the color filter substrate, wherein the array substrate comprises a bonding area; and a reinforcing device disposed between the bonding area and an edge of the array substrate, and an adhesive layer is disposed on a surface of the reinforcing device corresponding to the array substrate; wherein one end of the reinforce device is connected to the bonding area, and the other end extends to the edge of the array substrate, and the reinforcing device is disposed between each of two opposite ends of the bonding area and the edge of the array substrate; and wherein the reinforcing device comprises a base, a retaining wall disposed on the base, and an accommodation groove formed by the retaining wall, wherein a reinforcing glue is disposed in the accommodation groove.

The present invention further provides a display device, comprising the abovementioned display panel structure.

The present invention provides the display panel structure and the display device utilizing the base, the retaining wall, and the accommodation groove as a whole to function as a support frame for the reinforcing glue, thereby to ensure that the reinforcing glue is not spreading over the retaining wall and to prevent stress concentration from being caused by overflowing glue to adversely affect structural reinforcement. Furthermore, the present invention utilizes the reinforcing device formed by the reinforcing glue, the retaining wall, and the base to provide a dual reinforcing structure, thereby effectively enhancing structural strength around the bonding area of the array substrate, so that a problem that the array substrate is prone to crack due to a single layer structure can be prevented.

DESCRIPTION OF PREFERRED EMBODIMENTS

The following embodiments are referring to the accompanying drawings for exemplifying specific implementable embodiments of the present invention. Directional terms described by the present invention, such as upper, lower, front, back, left, right, inner, outer, side, etc., are only directions by referring to the accompanying drawings, and thus the used directional terms are used to describe and understand the present invention, but the present invention is not limited thereto.

Figure 1:
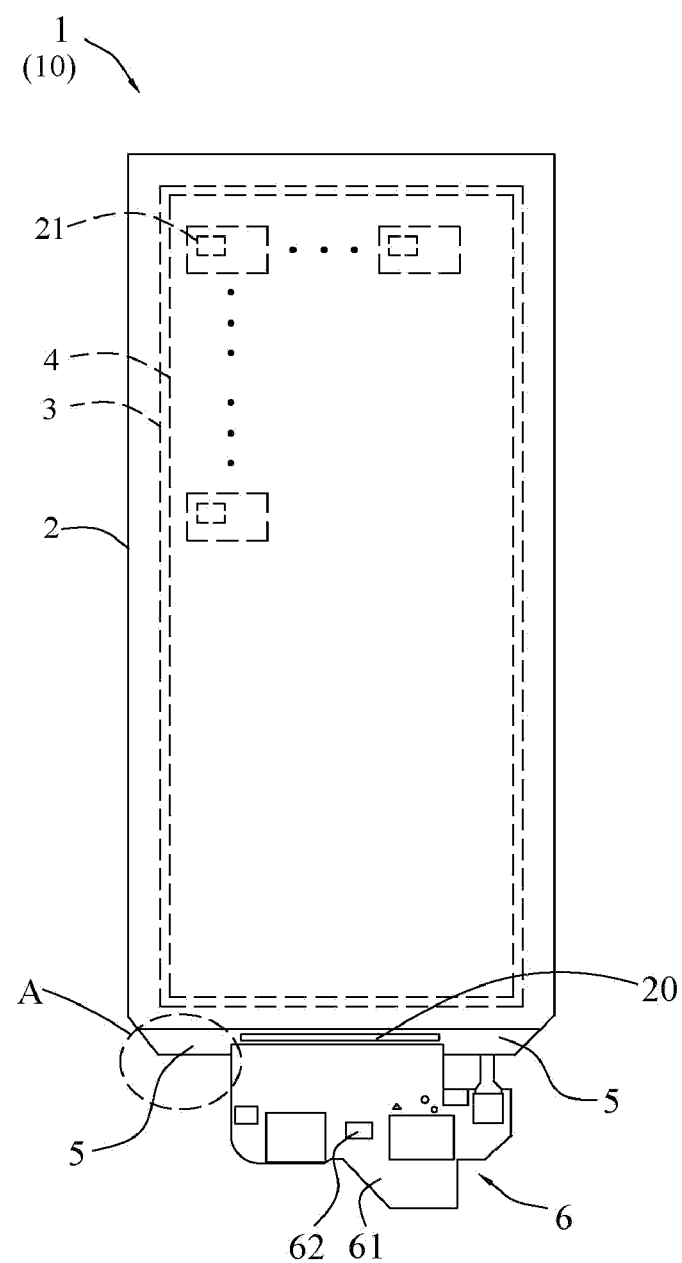
FIG. 1 is a schematic plan view of a display panel structure of a preferable embodiment of the present invention.
Figure 2:
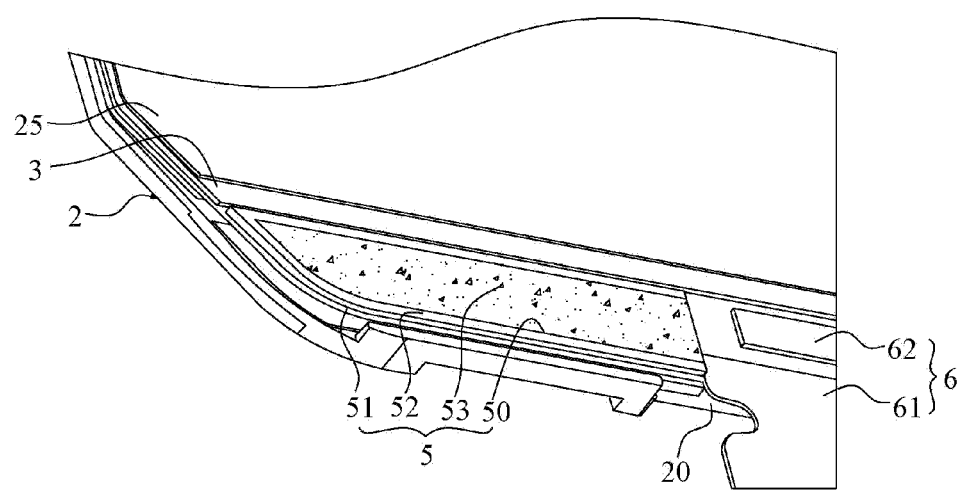
FIG. 2 is a schematic enlarged structural view of A portion of the display panel structure of FIG. 1.

The present invention relates to a display panel structure, and particularly to a display panel having a reinforcing structure, wherein the display panel may be a liquid crystal display panel or an organic light-emitting diode (OLED) display panel. In this preferable embodiment, the display panel structure of the present invention is exemplified by a liquid crystal display (LCD) display panel. FIG. 1 is a schematic plan view of a display panel structure of a preferable embodiment of the present invention. The present invention provides a display panel structure 1, including an array substrate 2, a color filter substrate 3, and a liquid crystal layer 4 disposed between the color filter substrate 3 and the array substrate 2, wherein a lower polarizer (not shown) is disposed on a side of the array substrate 2. Another side of the array substrate 2 is configured with a plurality of thin-film transistors 21 arranged in an array and connected to a plurality of scan lines and data lines (not shown), wherein each of the thin-film transistors is provided for a corresponding pixel unit. FIG. 2 is a schematic enlarged structural view of A portion of the display panel structure of FIG. 1. As shown in FIG. 2, the color filter substrate 3 and an upper polarizer 25 are disposed on the array substrate 2. The liquid crystal layer 4 (as show in FIG. 1) is configured to operate through a light source of a backlight module (not shown), with a voltage applied to the liquid crystal layer 4, in combination with the color filter substrate 3, the upper polarizer 25, and the lower polarizer to display images. That is, the array substrate 2 of the present invention has structural components the same as that of conventional LCD panels. Other necessary components required for the LCD panels and functions of the various components are not described here.

Please continue referring to FIG. 1. The array substrate 2 includes a bonding area 20 disposed on a bottom edge adjacent to a middle portion, that is, a non-active area of the display panel structure 1. The bonding area 20 is configured to connect a driver module 6. Specifically, the driver module 6 includes a flexible printed circuit board 61 and a chip 62 disposed on the flexible printed circuit board 61, wherein the chip 62 may be a source driver chip (but not limited thereto) for providing driving signals to the thin-film transistors 21. That is, the display panel structure of the present invention has a chip on flex (COF) structure. In another embodiment, the display panel structure of the present invention may be a chip on glass (COG) structure.

As described above, the bonding area 20 of the array substrate 2 is configured to connect the driver module 6 (as shown in FIG. 2). Since the bonding area 20 is only made of a single layer of glass, in a case where the bonding area 20 carries the driver module 6, a portion on the array substrate 2 adjacent to the bonding area 20 is prone to crack due to insufficient structural strength. The display panel structure of the invention is improved for drawbacks of the insufficient structural strength as mentioned above. Please refer to FIGS. 3 and 4, which are schematic enlarged views showing a partial structure of the display panel structure of the present invention, respectively. The display panel structure 1 of the present invention includes a reinforcing device 5 disposed between the bonding area 20 and an edge of the array substrate 2. Specifically, there are two reinforcing devices 5 each disposed between each of two opposite ends of the bonding area 20 and the edge of the array substrate 2. Specifically, one end of each of the reinforce devices 5 is connected to an end portion of the bonding area 20, and the other end extends to the edge of the array substrate 2. That is, each of the reinforcing devices 5 is disposed along the edge of the array substrate 2, and is located at the non-active area by the two opposite ends of the bonding area 20.

Figure 3:
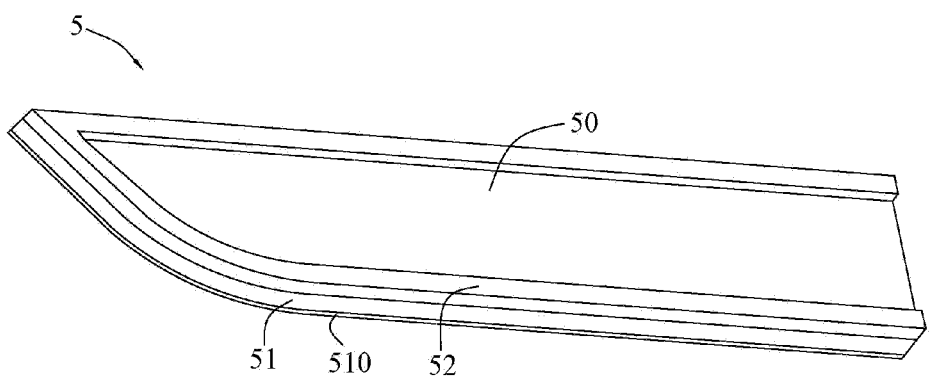
FIG. 3 is a schematic enlarged view showing a partial structure of a display panel structure of the present invention.
Figure 4:
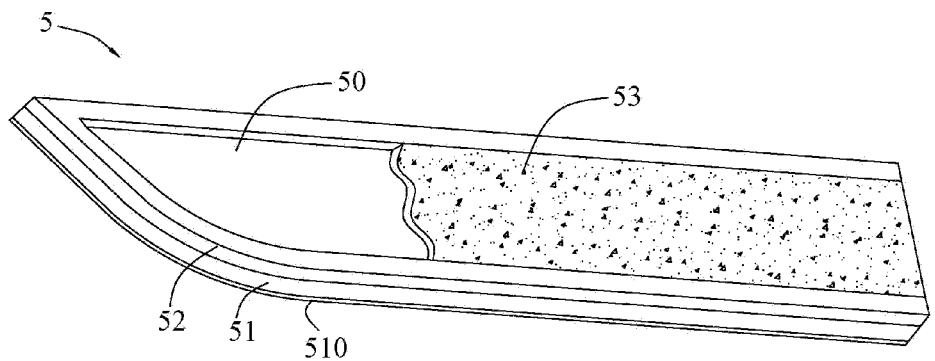
FIG. 4 is another schematic enlarged view showing a partial structure of a display panel structure of the present invention.

Please continue referring to FIGS. 2, 3, and 4. In this preferable embodiment, the reinforcing device 5 includes a base 51, a retaining wall 52 disposed on the base 51, and an accommodation groove 50 formed by the retaining wall 52, wherein an adhesive layer 510 is disposed on a surface of the base 51 corresponding to the array substrate 2 (as shown in FIG. 3) for adhesively fixing the reinforcing device 5 on the array substrate 2. That is, the reinforcing device 5 can be regarded as a reinforcing tape, and the reinforcing device 5 formed by the base 51 and the retaining wall 52 can function as a reinforcing structure to enhance structural strength of the array substrate 2 at portions adjacent to the two end portions of the bonding area 20. In this preferable embodiment, the base 51 and the retaining wall 52 may be made of a plastic material such as polyethylene terephthalate (PET), or a metal material such as copper foil.

As shown in FIGS. 2 and 3, the retaining wall 52 is disposed along the edge of the base 51 and protrudes from the base 51 at a height so that the retaining wall 52 surrounds the base 51 to form the accommodation groove 50, wherein a width of the retaining wall 52 is 0.1-2 millimeters (mm), and a height of the retaining wall 52 is 0.01-0.35 mm. Particularly, a reinforcing glue 53 is disposed in the accommodation groove 50 (as shown in FIG. 2), wherein the reinforcing glue 53 may be Silicone glue. Since the accommodating groove 50 is surrounded by the retaining wall 52, an area of the reinforcing glue 53 covering the accommodating groove 50 is less than that of the base 51, and a thickness of the reinforcing glue 53 is equal to or less than the height of the retaining wall 52. Restrained by the retaining wall 52, a periphery of the reinforcing glue 53 adjoins a side of the retaining wall 52 in the retaining groove 50. In other words, the reinforcing glue 53 can be completely filled up in the accommodating groove 50 (as shown in FIG. 2). Since a glue substance will flow and spread everywhere before being uncured, the reinforcing glue 53 of the present invention does not overflow outside the retaining wall 52 because it is blocked by the retaining wall 52, so that the reinforcing glue 53 can be effectively filled up in the accommodation groove 50 (as shown in FIG. 4) and tightly adheres to the retaining wall 52 and the base 51 to integrally form the reinforcing device 5.

The present invention further provides a display device 10 (as shown in FIG. 1). The display device 10 of the present invention includes the display panel structure 1 as disclosed in the previous paragraphs, wherein the detailed structure of the display panel structure 1 has been described in detail in the previous paragraphs, and is not reiterated herein.

The present invention provides the display panel structure and the display device utilizing the base 51, the retaining wall 52, and the accommodation groove 50 as a whole to function as a support frame for the reinforcing glue 53, thereby to ensure that the reinforcing glue 53 is not spreading over the retaining wall 52 and to prevent stress concentration from being caused by overflowing glue to adversely affect structural reinforcement. Furthermore, the present invention utilizes the reinforcing device 5 formed by the reinforcing glue 53, the retaining wall 52, and the base 51 to provide a dual reinforcing structure, thereby effectively enhancing structural strength around the bonding area 20 of the array substrate 2, so that a problem that the array substrate 2 is prone to crack due to a single layer structure can be prevented.

Accordingly, although the present invention has been disclosed as a preferred embodiment, it is not intended to limit the present invention. Those skilled in the art without departing from the spirit and scope of the present invention may make various changes or modifications, and thus the scope of the present invention should be after the appended claims and their equivalents.

What is claimed is:

1. A display panel structure, comprising:
   an array substrate, a color filter substrate, and a liquid crystal layer disposed between the array substrate and the color filter substrate, wherein the array substrate comprises:
   a bonding area; and
   a reinforcing device disposed between the bonding area and an edge of the array substrate and comprising a base and a retaining wall disposed along and protruding from a periphery of the base, the base extending to a bottom of the retaining wall, and the base and the retaining wall collectively defining an accommodation groove located over the base, wherein an adhesive layer is disposed on a surface of the base different from an opposite surface of the base where the retaining wall is located on and the adhesive layer is sandwiched between the base and the array substrate, the base is laminated on the adhesive layer such that the reinforcing device is adhesively fixed on the array substrate through the adhesive layer, and a reinforcing glue is disposed in the accommodation groove;
   wherein an orthographic projection of the retaining wall on the array substrate completely coincides with an orthographic projection of the adhesive layer on the array substrate, and an orthographic projection of the reinforcing glue on the array substrate falls entirely within the orthographic projection of the base on the array substrate.

2. The display panel structure of claim 1, wherein the retaining wall has a height higher than a surface of the base, wherein thickness of the reinforcing glue is equal to or less than the height of the retaining wall.

3. The display panel structure of claim 1, wherein a periphery of the reinforcing glue adjoins a side face of the retaining wall adjacent to the accommodation groove.

4. The display panel structure of claim 1, wherein the reinforcing glue is silicone glue.

5. The display panel structure of claim 1, wherein the base and the retaining wall of the reinforcing device are made of plastic or metal.

6. The display panel structure of claim 1, wherein one end of the reinforce device is connected to the bonding area, and the other end extends to the edge of the array substrate, wherein the reinforcing device is disposed between each of two opposite ends of the bonding area and the edge of the array substrate.

7. The display panel structure of claim 1, wherein a driver module is disposed on the bonding area and comprises a flexible circuit board and a chip disposed on the flexible circuit board.

8. The display panel structure of claim 1, wherein the array substrate comprises a plurality of thin-film transistors, and an upper polarizer is disposed on the color filter substrate.

9. A display device, comprising the display panel structure of claim 1.

* * * * *